United States Patent Office 3,753,962
Patented Aug. 21, 1973

3,753,962
RECOVERY OF A WATER SOLUBLE POLYMER POWDER FROM AN AQUEOUS GEL OF SAID POLYMER
Alfred Joseph Restaino, Wilmington, Del., assignor to Atlas Chemical Industries, Inc., Wilmington, Del.
No Drawing. Continuation-in-part of applications Ser. Nos. 781,975, and 782,000, both dated Dec. 6, 1968, both now abandoned. This application Mar. 16, 1970, Ser. No. 20,154
Int. Cl. C08f 1/88
U.S. Cl. 260—80 M                14 Claims

ABSTRACT OF THE DISCLOSURE

A process is described for the recovery of a high molecular weight polymer as a water-soluble powder from a stiff, rubber like aqueous gel of the polymer. The processing steps include: cutting the rubbery polymer gel, which is formed during the polymerization of the polymer, contacting the cut gel with a water miscible and polymer immiscible solvent causing a precipitate of the polymer to form, and then recovering the polymer precipitate by separation.

---

This is a continuation in part of application Ser. No. 781,975 filed Dec. 6, 1968, and application Ser. No. 782,000 filed Dec. 6, 1968 both now abandoned.

This invention relates to a process for recovering as a dry or a partially dry organic powder a high molecular weight polymer which is formed in an aqueous polymerization system as a stiff non-pourable, rubber-like aqueous polymer gel. More particularly, the process involves a cutting of a stiff rubbery aqueous polymer gel and contacting the cut gel with an organic liquid in which water is miscible, causing a precipitate of the high molecular weight polymer to form.

In the art of producing high molecular weight polymers in an aqueous suspension, or emulsion polymerization system, the object of the art, before the invention described in this specification, was to maintain an easily handleable fluid system. The formation of a gel during the polymerization process was avoided because once a stiff rubbery gel had formed recovery of the polymer from the gel was extremely difficult. It had been found that the drying of a gel had deleterious effects on the properties of the recovered polymer. That is, the polymer could undergo cross-linking between chains or degrade, both of which effected the properties of the polymer. Furthermore, where a gel had been formed, simple cutting or extruding techniques were to no avail as the gel would block equipment or immediately re-agglomerate in handling. Thus, extruding a stiff rubbery gel of acrylamide-acrylic acid copolymers into an agitated tank of organic fluid without particulating by mechanical means, resulted in re-agglomeration of the extruded polymer gel. When prior art methods of treating viscous solutions, such as the methods of U.S. Pat. Nos. 3,215,680, 3,042,970 and 3,255,142, are used with these stiff rubber-like gels, the equipment clogs. The process of this invention overcomes the objections to obtaining a rubbery gel product during aqueous polymerization to a high molecular weight polymer, and in fact by going the route of a rubbery gel and recovering the polymer from the rubbery gel as detailed in the following description significantly higher molecular weight polymers are obtained with superior properties.

It is an object of this invention to provide a process whereby a stiff rubber-like aqueous gel of a water-soluble high molecular weight polymer may be converted to a free flowing relatively dry powder form of the high molecular weight polymer which is essentially water soluble.

It is another object of this invention to provide a process whereby the conversion of the polymer gel is quick and efficient, resulting in recovering powdered, high molecular weight polymers from aqueous polymer gels that is both practical and economic.

Still other objects of this invention will become apparent to those skilled in the art from the following detailed description of the invention.

In general the process of producing an essentially water-soluble high molecular weight powder from a stiff rubber-like aqueous gel of said high molecular weight polymer in accordance with the invention comprises: subjecting said aqueous gel to a mechanical cutting means, contacting the cut aqueous gel with an organic liquid in which water is miscible but the high molecular weight polymer is essentially insoluble, thus extracting the water from the aqueous gel particles and precipitating the high molecular weight polymer as granules or powder; and separating the precipitate from the bulk of the water-organic liquid solution, thereby obtaining an essentially water-soluble product which is at least 50 weight percent solids. In a preferred process, the percent solids are further increased to at least 70 weight percent by removing most of the remaining liquid from the precipitate by drying said precipitate to form an essentially water-soluble dry polymer. In both of the above process descriptions particles are formed by the cutting means, however, these particles may be partially re-agglomerated prior to extraction of the water from the aqueous gel.

The term "essentially water soluble" when used in relation to the dry polymer products of the present invention means that at least 90% of the polymer dissolves in water in accordance with the following test: the polymer is dispersed in water, in a weight ratio of 1 to 1000 respectively, by stirring the mixture with a magnetic stirrer at 200 r.p.m. for a period of two hours. A 100 gram aliquot of the resultant dispersion-solution is filtered through a 100 mesh screen. The 100 mesh screen is then washed with 300 cc. of distilled water. The filter cake remaining on the 100 mesh screen is dried at a temperature of about 115° C. until constant weight. The dried portion, which is the insoluble part of the polymer, must be less than 10 weight percent of the polymer contained in the 100 gram aliquot. This is determined by dividing the weight of the dried portion by the weight of polymer in the 100 gram aliquot. The water temperature used for this test is 25° C., unless the polymer is starch containing in which case warm water at a temperature of 70° C. is used. Naturally, it is preferred that the amount of insolubles as determined by the above test be minimal and a polymer which is at least 95 percent soluble is preferred. Owing to the high molecular weight of these polymers a soft gel may be formed, from some of these polymers, at concentrations as low as a 1 or 2 weight percent of the solution.

A further characteristic of the polymers produced by the method of this invention is that they have high intrinsic viscosities. The technique used in determining the intrinsic viscosity is as follows: enough of the prepared dry or partially dried polymer, recovered from the gel by the process of this invention, is added to water in an opaque cylindrical vessel, to form a 0.1 weight percent solution. The polymer is stirred by slowly rotating the cylindrical vessel on its longitudinal axis at a speed of less than 40 r.p.m., for a period of 24 hours. At this point sufficient 2 N NaCl or NaOH solution, as indicated below, is added to adjust the concentration of polymer to 0.05 gram of polymer per 100 ml. of solution. The viscosity of this solution is then measured at 25° C. with an Ubbelohde viscometer and the intrinsic viscosity determined per the method reported by Paul J. Flory in his book Principles of Polymer Chemistry, Cornell University Press, 1953 at pages 303 through 314. For the polymers of this invention containing polyacrylamide the intrinsic viscosity is determined in 2 N NaCl at 25° C., for polymers of acrylic acid and its salts a 2 N NaOH solution at 25° C. is used. In the cases where a copolymer contains so much acrylic acid as to make it insoluble in 2 N NaCl, usually, where more than 90 percent is acrylic acid, 2 N NaOH is used. Naturally if a different salt or no salt is used this viscosity will vary, since, as is well known in the art the polymers may not be sufficiently solubilized or may exist in a pseudo-solubilized state, i.e. the polymer molecules may be entangled. Thus a water solution of this polymer may yield intrinsic viscosities as high as 200 dl./gm.

The cutting means used in this process of recovering a solid essentially water-soluble polymer powder from the aqueous polymer gel, can be any means which cuts the gel without substantially degrading or cross-linking the polymer. Devices such as grinder-extruders, slicing machines, dicing machines, and blade-like mixing devices which break the gel into small particles are appropriate as long as the local heat generated during the subdividing is not so excessive as to produce insolubilization. Said blade-like mixing devices may slice, tear, shred, or rip the gel into small particles. A preferable means of dividing the rubbery gel is by extrusion into long strands and then breaking these strands with blade-like mixers such as the Cowles Dissolver. Extrusion is the preferred means of cutting the gel because it may be conveniently used in a continuous gel processing plant. An ordinary meat grinder, which cuts the mass of material being ground, has been found particularly suitable as an extrusion means for use in accordance with the invention. For practical through-put and to avoid excess shear and degradation resulting from heat build-up, extruder die holes at least 1/16'' in diameter are usually employed and it is generally preferred that the die holes be about 5/64'' in diameter. It must be emphasized at this point that by a cutting means a cutting blade or stirrer is meant and is always used at some point for the process to work.

The contacting of the gel with the organic liquid and the cutting of same can be accomplished either simultaneously or in separate steps. It is preferred to subdivide in the presence of the organic liquid.

The organic liquids which have been found useful in this process possess the following properties: they boil at temperatures below about 150° C. at processing pressure; they are non-reactive with the high molecular weight polymer, under process conditions, and they are both essentially miscible with water and a non-solvent for the polymer to be extracted. The reasons that the organic liquid used in this process must have the above properties are as follows: first, as to boiling point, if an organic liquid with a boiling point much in excess of 150° C. the polymer during the drying stage may become excessively hot and thus may cause degradation and/or cross-linking of the polymer and result in the polymer becoming insoluble or less soluble in water. The non-reactive property is necessary since any solvent which will react with the polymer could result in a new polymer which was cross-linked and/or insoluble in water. As to the miscibility in water and the non-solvent property for the polymer, these two properties are necessary to achieve water extraction and recovery of the polymer from the gel. In a preferred process the solvents used are selected from the group consisting of methyl alcohol, ethyl alcohol, propyl alcohol, isopropyl alcohol, tertiary butyl alcohol, and acetone.

During the stage of the process where the particulated solid gel is contacted with an organic liquid, a sufficient volume of organic liquid should be used to remove the desired amount of water from the gel. This volume will vary depending upon the particular method used to extract the polymer precipitate from the gel. Thus, when a batch process is used, as when the gel is subdivided in a tank of organic liquid until the precipitation is complete, the volume ratio will usually be at least about 1½ parts of liquid per part of gel. However, as will be readily understood by those skilled in the extraction art, when a semi-continuous or multiple batch process is used wherein the gel and the organic liquid flow counter-currently a lower ratio of organic liquid to gel can be used. This lower ratio is dependent upon the number of stages in the extraction step; that is, the greater the number of stages the more efficiently the organic liquid is utilized and the smaller the ratio between the organic liquid and the gel which is necessary. In certain cases it has been found that a ratio below 1:1 performs adequately.

Although it is preferred to use a pure organic liquid, a mixture of the organic liquid and water may be used in the process as easily as a pure organic liquid. In a multiple batch process, to achieve the most efficient use of solvent, it has been determined that the organic liquid should not contain excessive amounts of water although as much as 40% water may be used.

In carrying out this process the ratio of organic liquid to gel will usually not exceed 10:1 by volume. Although higher ratios may be used, it is desirable to avoid excessive volumes of solvent being circulated through the system.

After the organic liquid step, the precipitate may be separated from the bulk of the liquid by decantation, filtration, centrifugation, distillation or any combination of these or similar means of liquid-solid separation. After the precipitate is separated from the mixture of organic liquid and water, the organic liquid may be recovered from the mixture by distillation or other suitable methods. If distillation is used and an azeotropic mixture is formed, because of the particular organic liquid being used, the azeotropic mixture can easily be used in carrying out this process. Where the polymerization reaction was not carried out to completion to form the polymer gel and the gel contained excess monomer, the monomer will remain in the aqueous liquid phase and not precipitate out with the polymer. Thus where this procedure is used the water-organic liquid mixture is a solvent for the monomer. When the organic liquid is volatilized, leaving the monomer in aqueous solution, this monomer solution may be used as feed in forming the polymer, i.e. recycled.

During the drying stage of the preferred process of this invention, that is when the excess liquid which has adhered to or has been trapped by the high molecular weight polymer is driven off, the drying conditions of the polymer-organic liquid mass are controlled so that the resultant dried polymer is essentially water soluble and preferably so as to provide a product having at least about 70% solids. The parameters that determine the drying cycle are time, temperature and pressure. For example, at a drying medium temperature of 200° C. and atmospheric pressure the duration of the drying cycle must be maintained to periods less than one-half hour in order to produce acceptable polymer. The temperature of the polymer is, of course, less than that of the drying medium since the solvent is evaporating. It is not usually necessary to dry more than enough to produce a product having about 90 weight percent solids. Higher solids content products may be made, in accordance with the invention but such products have usually been found to be no more desirable and may contain a higher percent insolubles especially when the percent solids increases beyond 98 weight percent. The time, temperature and pressure should be controlled to obtain a soluble product after the drying stage. Low pressure promotes drying and permits the use of low temperatures. The temperature to which the polymer gel is subjected need only be sufficiently higher than the vaporization temperature of the organic liquid to create a driving force but higher temperatures promote drying as do longer drying time, but care should be taken to avoid such high temperatures that any undesired amount of degradation or insolubilization occurs. Forced draft furnaces, natural draft furnaces and other types of heater-dryers can be used.

This process is particularly advantageous when treating the gels formed during polymerization of the following polymers: high molecular weight acrylic acid polymers and its salts, whose intrinsic viscosity is greater than six deciliters per gram in a two normal sodium hydroxide solution at 25° C.; homopolymers and copolymers of the water-soluble monomers conforming to the formula

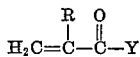

and mixtures of such monomers or water-soluble mixtures of such monomers with other vinylidene monomers. In this formula R represents hydrogen or methyl and Y represents —$NH_2$, OH, or

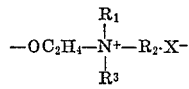

wherein $R_1$, $R_2$, and $R_3$ are 1 to 4 carbon alkyl radicals and X is an anion. Among the monomers conforming to the formula are acrylamide, methacrylamide, dimethyl aminoethyl methacrylate quaternized with dimethyl sulfate, diethyl aminoethyl acrylate quaternized with ethyl chloride, dimethyl aminoethyl acrylate quaternized with dimethyl sulfate, and such other vinylidene monomers. Other equivalent monomers such as salts of primary and secondary amines of the above vinylidene monomers can be used. Polymers formed by polymerizing mixtures of the above monomers as well as water-soluble mixtures of such monomers with acrylonitrile, acrylic acid, vinyl sulfonic acid, vinyl phosphonic acid, or the water-soluble salts of any of the later monomers, all form gels under the proper reaching conditions which are effectively broken by using the above process. All of these polymers have been found to be excellent flocculants and the process of this invention results in a dry or partially dry polymer which has substantially retained its high molecular weight and thereby essentially maintained the flocculating properties that the polymer possessed in the rubbery-gel form.

This process is particularly advantageous for polymers with intrinsic viscosities higher than 9 deciliters per gram as measured according to the afore-mentioned method. One class of polymers prepared from the vinylidene monomers discussed above, which has great flocculant potential and forms extremely stiff-rubbery reaction products, and, thus for which this process is especially applicable in that of polyacrylamide or polyacrylic acid and its salts, their copolymers and the N,N-dimethylaminoethyl acrylate dimethyl sulfate (DMAEA·Q) copolymer with acrylamide. The nonionic acrylamide polymers and copolymers of acrylamide containing up to 80 weight percent sodium acrylate for which this process is especially useful have intrinsic viscosities of at least 15 dl./gm. Whereas DMAEA·Q-acrylamide copolymers and polyacrylate homopolymers have intrinsic viscosities of at least 9 dl./gm.

In treating gels formed during the polymerization of the above preferred class of organic polymers the following processing hazards are preferably avoided: the crosslinking of the long chains of the polymers; the degradation of the chains due to excessive temperature within the polymer mass; and the production of a treated polymer which contains too low a solids content, i.e., is sticky due to excessive water. The reason for avoiding crosslinking and degradation are that they both seriously decrease the flocculant potential of the final high molecular weight polymer and both may effect its solubility. Too low a solids content can result in re-agglomeration of the precipitated polymer. In a preferred embodiment of the present process of extracting the dry polymer from its aqueous gel the method of subdividing used is usually extrusion through a grinder extruder having an extrusion plate containing holes of about 5/64 inch in diameter or greater, the pressure is kept at or below atmospheric, the processing temperature of the drying medium is usually below 200° C., the organic liquid is either, methanol, ethanol, propanol, isopropanol, tertiary butyl alcohol or acetone, and in contacting the extruded gel strands with the organic liquid a stirring device which breaks the strands is used.

As a result of preparing the polymer powder in accordance with the process of this invention the polymer powder is easily dissolved in water due to the small particle size and yet not so small as to cause a dust problem in handling. This advantage enables the art to more easily use these polymer products.

To better enable those skilled in the art to practice the subject invention the following non-limiting examples are given to illustrate the invention of this specification. In some specific examples the preparation of the polymer gel which is not part of the invention claimed in this specification is described to illustrate how a starting material, that is the gel, is obtained.

EXAMPLE 1

1800 grams of deobase kerosene, 26 grams of 2-dendro stearyl alcohol, 250 grams of acrylamide, 500 grams of distilled water, and 0.1 gram potassium sulfate are suspended in an additional 100 cc. of water in a 4-liter beaker. The beaker is heated on a hot plate and after 40 minutes have elapsed the temperatuure of the suspension is found to be 78° C. and polymerization at the bottom of the flask is visible. The polymerizing suspension is then removed from the hot plate and due to the exothermic reaction the temperature continues to rise to a peak of 90° C. after a half-hour. A continuous gel phase is formed. The excess water is decanted from the gel and to this gel is added methyl alcohol. The wet gel is subdivided and is then ground to a 20 mesh size in a Wiley Mill filtered and vacuum dried at room temperature. A portion of the gel is dissolved in 0.025 normal hydrochloric acid for viscosity molecular weight measurement. The intrinsic viscosity is 6.0 deciliters per gram. The product, polyacrylamide, is then further dried at 106° C. to a solids content of 88.4 weight percent. The resulting dried polymer is essentially water soluble. The Wiley Mill used herein is a rotating cutting mill wherein the blades cut the gel and simultaneously crush it against the mill housing.

EXAMPLE 2

72 grams of a 50 weight percent aqueous acrylic acid solution is mixed with 86 grams of 21 weight percent aqueous sodium hydroxide and cooled to 25° C., at this point 0.125 gram of potassium persulfate is added. A reaction then starts and is continued for 30 minutes at between 24 and 25° C., the temperature is then raised to 30° C. and maintained at this temperature for another 30 minutes. The temperature is then raised to 40° C. and maintained here for two hours, at which point the product homogeneously gels. The reaction vessel is then removed from the heat source and allowed to stand at room temperature for approximately 12 hours. The gel is removed from the reaction vessel by cutting it out with a sharp instrument. The gel is then cut into small cubes with a pair of culinary scissors. The cubes are added to acetone and wet ground with methyl alcohol to a 20 mesh size in a Wiley Mill. The product, sodium polyacrylic acid, is filtered and found to be 69 weight percent solids. The product is then dried at 106° C. to greater than 80 weight percent solids and is essentially water soluble.

EXAMPLE 3

25 grams of cornstarch and 25 grams of acrylamide is slurried with 25 grams warm distilled water. The mixture is placed in a polymerization tube and irradiated for four minutes at a dose rate of $1.05 \times 10^5$ rads per hour, in the presence of a cobalt-60 source. The resulting product, is a mixture of polyacrylamide starch graft copolymer, polyacrylamide, and starch is a gummy gellated mass. This mass is then cut into small pieces and placed in acetone. The wetted gel is ground in a Wiley Mill and passed through into a receiving vessel. The graft copolymer is then separated from the acetone water solution by filtration. The resultant powdered polymer is then dried in a conventional oven at 100° C. until essential dryness, at which point it is greater than 90 weight percent solids and essentially water soluble.

EXAMPLE 4

1000 grams of cornstarch, 90% solids, is slurried with 900 grams of acrylamide in 1800 milliliters of distilled water at room temperature. This slurry is then divided into two equal parts and irradiated at a dose rate of 100,000 rads per hour until an exothermic peak is reached, as measured by a thermo-couple in the reactor. The two parts are fused gel masses of a mixture of polyacrylamide starch graft copolymer, polyacrylamide and starch. These two parts are then cut from the reaction vessel and into smaller pieces. They are wet ground in a Wiley Mill in contact with methanol and then washed with acetone and methanol. The resultant powder is dried at about 80° C. until essential dryness, at which time the graft copolymer is greater than 90 weight percent solids and is essentially water soluble in 70° C. water.

EXAMPLE 5

200 grams of acrylamide and 0.6 gram of sodium acrylate are dissolved in 800 grams of distilled water. The pH is adjusted to 9.8 with sodium hydroxide. The solution is then poured into a polyethylene bag, flushed with purified nitrogen and sealed in the bag. The reaction solution is then irradiated by a cobalt-60 gamma ray source for a period of 22 minutes at a dose rate of 20,000 rads per hour. The resulting product is a rubbery polymeric gel of polyacrylamide-polyacrylate copolymer. The sausage-like gel is taken from the polyethylene bag and passed through a blade equipped extruder dividing the gel into ⅛ inch diameter strands. The extruded strands are stirred into methanol in a volume ratio of one part gel to five parts methanol for 30 minutes in a blender-type apparatus. Granules precipitate from this mixture and are separated from the solution by filtration. These granules are then heated at 28 inches of mercury for ten minutes at 100° C. The essentially water-soluble copolymer is thus dried to greater than 90 weight percent solids and has an intrinsic viscosity of 16.2 deciliters per gram when measured in two normal aqueous sodium chloride at 25.5° C.

EXAMPLE 6

5,000 grams of acrylamide monomer is slurried with a solution of 1250 grams of glacial acrylic acid and 692 grams of sodium hydroxide in 24,000 grams of distilled water. The pH of the system is adjusted to 9.4 and the solution is poured into a series of 8 inch diameter polyethylene bags which are purged with dry nitrogen and sealed. The polyethylene bags containing these solutions are exposed for 28 minutes to a cobalt-60 gamma radiation source at a dosage rate of 18,000 rads per hour. The irradiated solutions are all quantatively converted to a polyacrylamide polymer gel. A sample of this gel is then extruded through a commercial meat grinder forming ⅛ inch diameter strands of the gel. These gel strands are then soaked in five volumes of methanol per volume of gel while being stirred vigorously in a blender. Granules of polymer are precipitated during this stirring and separated by filtration from the liquid phase. These granules are then dried in 50 gram batches at 100° C. and a pressure of 28 inches of mercury for six minutes. The resultant particles are ground to 20 mesh in a Wiley Mill. A portion of the fine white powder resulting from this grinding is then dried until constant weight at 160° C. and is found to be 88.5 weight percent solids. The intrinsic viscosity in a two normal aqueous sodium chloride solution at 25.5° C. is found to be 23.7 deciliters per gram. An aqueous solution of the copolymer settles suspended solids in a 2% aqueous colloidal kaolin clay suspension at a rate of 8.2 feet per hour when administered at a dose of 0.4 part per million based on clay suspension. This polyacrylamide solid has no insoluble fraction as determined from solubility tests of a 0.1 weight percent aqueous solution at room temperature.

EXAMPLE 7

A portion of the polyacrylamide acrylic acid copolymer prepared in Example 6 is extruded according to Example 6 into strands and mixed with ethanol in a one to ten volume relationship respectively. The resulting precipitate is filtered and ground to a 20 mesh size in a Wiley Mill. The ground product is dried at 100° C. for 15 minutes to 87 weight percent solids. The intrinsic viscosity is 23.7 deciliters per gram in two normal aqueous sodium chloride solution at 25.5° C. This polyacrylamide solid has no insoluble fraction as determined by a solubility test of a 0.1 weight percent aqueous solution at room temperature.

EXAMPLE 8

A portion of the acrylamide acrylic acid copolymer prepared in Example 6 is extruded per the procedure of Example 6 and mixed in a ratio of one volume of gel to ten volumes of alcohol with isopropyl alcohol. The resulting precipitate is separated from the alcohol water solution and dried at 100° C. for 15 minutes to 84.5 weight percent solids. When tested an aqueous solution the copolymer has a settling rate of 8.2 feet per hour in a 2 weight percent colloidal kaolin clay suspension, when administered at a dose rate of 0.4 part per million based on clay suspension. This polyacrylamide solid has no insoluble fraction when dissolved as a 0.1 weight percent aqueous solution at room temperature.

EXAMPLE 9

A portion of the polymer prepared in Example 6 was extruded according to Example 6 into tertiary butyl alcohol and then stirred in contact with this tertiary butyl alcohol in a ratio of gel to alcohol of about 1 part to 10 parts. The resultant precipitate was separated from the alcohol water solution and dried. The dried polymer is found to have a settling rate of 8.2 feet per hour when used to separate a 2% aqueous colloidal kaolin clay suspension at a dosage rate of 0.4 part per million based upon clay suspension. This polyacrylamide solid has no insoluble fraction when dissolved as a 0.1 weight percent aqueous solution at room temperature.

EXAMPLE 10

A portion of the polymer prepared in Example 6 is extruded according to the procedure of Example 6 and mixed in a one part to ten part ratio with acetone respectively. A white powder precipitates while stirring the above mixture. The white powder is separated from the acetone water solution by filtration and dried at 100° C. and 28″ Hg for 10 minutes to yield a polymer containing 84.5 weight percent solids. The dried powder is found to have a rate of separation of 2% aqueous colloidal kaolin clay suspension of 8.2 feet per hour when administered at a dose rate of 0.4 part per million based on clay suspension. This polyacrylamide solid has no insoluble fraction as determined by solubility tests of a 0.1 weight percent aqueous solution at room temperature.

EXAMPLE 11

12 grams of non-distilled glacial methacrylic acid, 25 grams of distilled water, 7 grams of kerosene and 1 gram of sorbitan monooleate, to form an emulsion, are placed in a glass reaction vessel. The atmosphere of the reaction vessel is flushed with a high purity nitrogen stream and the reactor is irradiated for 90 minutes with a cobalt 60 gamma ray source at a dosage rate of 20,000 rads per hour. The resulting product is a stiff white polymeric gel of polymethacrylate. The polymer is ground in a Wiley Mill to pass through a 20 mesh screen and is then treated with a sodium hydroxide solution of methyl alcohol. A white precipitate results which is separated from the supernate by filtration. The filtered solids are still wet with alcohol and are dried at 28 inches of mercury and room temperature until essentially constant weight, at which time the product was greater than 80 weight percent solids. The product is found to be essentially water soluble.

EXAMPLE 12

44.68 grams of N,N-dimethylaminoethylmethacrylate (DMAEM) and 61.1 grams of aqueous four normal hydrochloric acid are slowly mixed in a reaction vessel. The resulting pH is approximately 7. This solution is poured into a polyethylene sleeve reactor and is then exposed to a cobalt 60 gamma ray source for 57 minutes at a dosage rate of 20,000 rads per hour. The maximum exotherm which results during the reaction is 48.5° C. The product, poly DMAEM·HCl, which results is a polymeric gel. This polymer is ground in a Wiley Mill in the presence of acetone until it passes through a 20 mesh screen. The ground gel is then further mixed with acetone and a yellowish white powder precipitate is formed. This precipitate is separated by filtration from the acetone water solution and dried at room temperature and 28 inches of mercury until constant weight is achieved. The final product is greater than 70 weight percent solids and is essentially water soluble.

EXAMPLE 13

30 grams of N,N-dimethylaminoethyl methacrylate·dimethyl sulfate (DMAEM·Q) and 12 grams of water are stirred together and the resultant solution poured into a polyethylene reaction sleeve. The solution in the polyethylene reaction sleeve is flushed with high purity nitrogen and is then exposed for 26 minutes at a dose rate of 20,000 rads per hour to a gamma ray cobalt-60 source. A maximum exotherm of 58.5° C. is achieved during the reaction and the product which results is a stiff polymeric gel of poly DMAEM·Q. This gel is wet ground in the presence of acetone to a 20 mesh size in a Wiley Mill. After grinding the subdivided gel is mixed with more acetone and a white powder precipitate separates from the acetone water solution which is filtered from the supernate and dried at room temperature at 28 inches of mercury until it reaches a constant weight. This DMAEM·Q polymer has an intrinsic viscosity of 3.85 deciliters per gram in two normal sodium chloride at 25° C., is greater than 70 weight percent solids and is essentially water soluble.

EXAMPLE 14

400 grams of a 20 weight percent 80-20 polyacrylamide-acrylic acid copolymer aqueous gel is extruded through a commercial meat grinder forming strands of gel about 3/16 inch in diameter. The gel strands are continuously fed to an agitated tank where methyl-ethyl ketone is contacted with the strands in a volume ratio of 2:1 respectively. The polymer precipitates and is continuously separated by a vacuum filter. The filtered precipitate is then dried at 175° C. at 27 inches of mercury until essential dryness, and contains less than 5 weight percent polymer when tested as a 0.1 weight percent aqueous solution at 25° C.

EXAMPLE 15

Using the extrusion and extraction procedures of Example 14, 100 grams of a 40 weight percent 50-50 polyacrylamide-vinyl sulfonic acid copolymer aqueous gel is subdivided and contacted with diethyl ketone in a solvent to gel volume ratio of 1.5 to 1. The resulting polymer precipitate is filtered from the solvent and dried at 100° C. and 28 inches of mercury until a solids level of 95 weight percent is attained. This 50-50 polyacrylamide-vinyl sulfonic acid copolymer is essentially water soluble.

EXAMPLE 16

190 grams of acrylamide and 10.0 grams of acrylic acid are dissolved in 465 grams of distilled water. The pH is adjusted to 9.5 with sodium hydroxide. The solution is then poured into a polyethylene bag, flushed with purified nitrogen and sealed in the bag. The reactant solution is then irradiated by a cobalt-60 source at a dose rate of 20,000 rads per hour for a total dose of 2,700 rads at which time 59.8% of the monomer is reacted. The resulting product, a rubber aqueous polyacrylamide polysodium acrylate copolymer gel, is taken from the polyethylene bag and passed through an extruder which divides the gel into 1/8 inch diameter strands. These strands are mixed into isopropanol in a one to three volume ratio respectively. A white precipitate of the polymer results and is separated from the solution by filtration. The precipitate, the polyacrylamide polysodium acrylate copolymer is then dried at 100° C. and 28 inches of mercury for ten minutes. The dried copolymer in a two normal aqueous sodium chloride solution at 25° C. is found to have an intrinsic viscosity of 31.4 deciliter per gram, and contains less than 5 parts of polymer insoluble in a 0.1% aqueous solution at 25° C.

EXAMPLE 17

Forty pounds of an 80-20 polyacrylamide-sodium polyacrylate copolymer gel is fed to a Rietz Disintegrator, a device using dull blades and a —20 mesh screen to subdivide, as a 6-inch diameter cylinder. Methanol is simultaneously fed to the Rietz Disintegrator and the gel is contacted with methanol and subdivided simultaneously. A polymer precipitate forms and the precipitate, water-methanol slurry is fed into a mixing vessel and there separated by vacuum filtration. The filter cake is then dried at 175° C. and 26 inches of mercury until essential dryness at which point it is better than 75 weight percent solids. The polyacrylamide sodium polyacrylate copolymer is found to be essentially water soluble in 25° C. water.

To illustrate the advantages of this process Table I is included as part of this specification. This table illustrates the effect of preparing an irradiated acrylamide sodium acrylate copolymer per the reaction procedure of Example 6 and then treating seven portions of the product by different means to obtain a dry powdered product. By examining this table it is easy to see that sample 7 which was dried at reduced pressure at 100° C. for two hours without contacting with an organic solvent had a drastic decrease in its ability to separate colloidal suspensions as compared to portions which have been contacted with organic liquid or portions of the gel itself which had had no treatment at all. In Table I, under polymer gel processing, the solvent used if any, the drying time, the pressure and the temperature used are listed. The weight percent solids and solubility of each sample is also listed.

TABLE I.—DRYING EFFECT

| Process code | Polymer gel processing | Percent solids | Solubility of a 0.1% conc. in H₂O, 25.5° C. (percent) | η dcl./gm. 2 N NaCl, 25.5° C. | Settling rate of a 2% colloidal kaolin clay [1], suspension in water, 25° C. [2] (ft./hr.) |
|---|---|---|---|---|---|
| Controls | None | 21 | 100 | 23.7 | 8.2 |
| Portion (1) | Extruded to 1/16″ | 21 | 100 | 23.7 | 8.2 |
| Portion (2) | Extruded to 1/16″, (MeOH) 100° C., 28″ Hg, 10 minutes | 88.5 | 100 | 23.7 | 8.2 |
| Portion (3) | Extruded to 1/16″, (EtOH) 100° C., 28″ Hg, 15 minutes | 87.0 | 100 | >20 | 8.2 |
| Portion (4) | Extruded 1/16″ (Isopropyl) alc. 100° C., 28″ Hg, 15 minutes | 84.5 | 100 | >20 | 8.2 |
| Portion (5) | Extruded 1/16″ (t-butyl) alc. 100° C., 28″ Hg, 15 minutes | 84.5 | 100 | >20 | 8.3 |
| Portion (6) | Extruded 1/16″ (acetone) 100° C., 28″ Hg, 10 minutes | 84.5 | 100 | >20 | 8.4 |
| Portion (7) | Extruded to 1/16″ dried 100° C., 28″ Hg, 2 hours (thermal) | 81 | 52.1 | 6.9 | 3.75 |

[1] Colloidal kaolin clay, N.F. Powder K-6 Lot #787667, Fisher Scientific Company.
[2] Polymer added from a 0.01% aqueous solution at a dose of 0.4 p.p.m. based on total volume of the slurry or at 20 p.p.m. based on clay solids. essel=100 ml. graduate.

Having thus described the invention, the following is claimed:

1. A process for recovering an essentially water-soluble, high molecular-weight polymer from a stiff, rubbery, non-pourable aqueous gel of said high molecular-weight polymer which comprises extruding a stiff, rubbery, non-pourable aqueous gel of a high molecular-weight polymer to form a strand of gel and subjecting said strand of gel to a blade-like mixing device, which cuts the strand of stiff, rubbery, non-pourable aqueous gel into small particles without substantially degrading or cross-linking the polymer, while contacting said strand of gel with an organic liquid, which boils below 150° C. at processing conditions, is essentially water miscible, with which the polymer is non-reactive, and which is a non-solvent for the polymer, thereby extracting water from said cut aqueous gel and precipitating the high molecular-weight polymer, and separating the precipitate formed during said contacting from the bulk of the water-organic liquid solution, thus obtaining a polymer product which is at least 50 weight percent solids, and essentially water-soluble.

2. A process according to claim 1 wherein said aqueous gel is formed into particles by extruding the gel through an extrusion plate having an orifice at least 1/16 of an inch in diameter to form a strand of gel and subjecting said strand of gel to a blade-like mixing device which cuts the strand while contacting said strand with said organic liquid.

3. A process according to claim 1 wherein said aqueous gel is formed into particles by extruding said gel through a grinder-extruder having an orifice of at least 5/64 inch in diameter to form strands of the gel and subjecting said strands of gel to a blade-like mixing device which cuts the strands while contacting said strands with said organic liquid.

4. A process according to claim 3 wherein said organic liquid is selected from the group consisting of methanol, ethanol, propanol, isopropanol, tertiary butyl alcohol, and acetone.

5. A process according to claim 4 wherein said aqueous gel is a gel of a polymer of a water-soluble monomer characterized by the formula

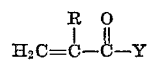

wherein R is a hydrogen or a methyl radical and y represents —OH, —NH₂, or

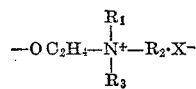

wherein $R_1$, $R_2$, and $R_3$ are 1 to 4 carbon alkyl radicals and X is an anion, a copolymer of a monomer conforming to the above formula and a monomer selected from the group consisting of acrylonitrile, vinyl sulfonic acid, vinyl phosphoric acid, and salts thereof, or a polymer of a salt of acrylic acid.

6. A process according to claim 4 wherein said non-pourable gel is a gel of a polymer selected from the group consisting of polyacrylamide having an intrinsic viscosity of at least 15 dl./gm. in 2 N sodium chloride at 25° C., copolymers of acrylamide and a salt of acrylic acid wherein the copolymer contains up to 80 weight percent of polymerizad acrylic acid salt and wherein the copolymer has an intrinsic viscosity of at least 15 dl./gm. in 2 N sodium chloride at 25° C., polyacrcylic acid and salts thereof having an intrinsic viscosity of at least 9 dl./gm. 2 N sodium hydroxide at 25° C., copolymers of acrylic acid and salts thereof containing more than 80 weight percent of polymerized acrylic acid or salt and having an intrinsic viscosity of at least 9 dl./gm. in 2 N sodium chloride at 25° C., and acrylamide-N,N-dimethylamino ethyl acrylate dimethyl sulfate copolymer having an intrinsic viscosity of at least 9 dl./gm. in 2 N sodium chloride at 25° C.

7. A process according to claim 1 for producing an essentially water-soluble, high molecular-weight polymer powder from a stiff, rubbery, non-pourable aqueous gel of said high molecular-weight polymer which comprises extruding a stiff, rubbery, non-pourable aqueous gel of a high molecular-weight polymer to form a strand of gel and subjecting said strand of gel to a blade-like mixing device which cuts the strand of stiff, rubbery, non-pourable aqueous gel into small particles without substantially degrading or cross-linking the polymer, while contacting said strand of gel with an organic liquid, which boils below 150° C. at processing conditions, is essentially water miscible, with which the polymer is non-reactive, and which is a non-solvent for the polymer, thus extracting water from said cut aqueous gel and precipitating the high molecular-weight polymer, separating the precipitate formed during said contacting from the bulk of the water-organic liquid solution, and then removing the remaining water-organic liquid solution from said precipitate, until said precipitate is at least 70 weight percent solids, by drying said precipitate and thus driving off the water-organic liquid solution adhering to and trapped by said polymer and forming the essentially water-soluble polymer.

8. A process according to claim 7 wherein said aqueous gel is formed into particles by extruding said gel through an orifice at least 1/16 of an inch in diameter to form strands of the gel and subjecting said strands to a blade-like mixing device which cuts the strands while contacting said strands with said organic liquid.

9. A process according to claim 7 wherein said aqueous gel is extruded through a grinder-extruder which cuts the gel and extrudes the gel through an orifice having a diameter of at least 5/64 inch to form cut strands of gel, contacting the cut strands of gel with an organic liquid, and subjecting the cut strands of gel to a blade-like mixing device which further cuts the gel while contacting the gel with the organic liquid.

10. A process according to claim 9 wherein said organic liquid is selected from the group consisting of methanol, ethanol, propanol, isopropanol, tertiary butyl alcohol, and acetone.

11. A process according to claim 10 wherein said aqueous gel is a gel of a polymer of a water-soluble monomer characterized by the formula

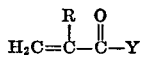

wherein R is a hydrogen or a methyl radical and y represents —OH, —NH$_2$, or

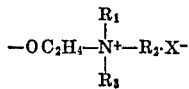

wherein $R_1$, $R_2$, and $R_3$ are 1 to 4 carbon alkyl radicals and X is an anion, a copolymer of a monomer conforming to the above formula and a monomer selected from the group consisting of acrylonitrile, vinyl sulfonic acid, vinyl phosphoric acid, and salts thereof, or a polymer of a salt of acrylic acid.

12. A process according to claim 10 wherein said gel is a gel of a polymer selected from the group consisting of polyacrylamide having an intrinsic viscosity of at least 15 dl./gm. in 2 N sodium chloride at 25° C., copolymers of acrylamide and a salt of acrylic acid wherein the copolymer contains up to 80 weight percent of polymerized acrylic acid salt and wherein the copolymer has an intrinsic viscosity of at least 15 dl./gm. in 2 N sodium chloride at 25° C., polyacrylic acid and salts thereof having an intrinsic viscosity of at least 9 dl./gm. in 2 N sodium hydroxide at 25° C., copolymers of acrylic acid and salts thereof containing more than 80 weight percent of polymerized acrylic acid or salt thereof and having an intrinsic viscosity of at least 9 dl./gm. in 2 N sodium chloride at 25° C., and acrylamide-N,N-dimethylamino ethyl acrylate dimethyl sulfate copolymer having an intrinsic viscosity of at least 9 dl./gm. in 2 N sodium chloride at 25° C.

13. A process according to claim 12 wherein the weight ratio of organic liquid to gel is at least 1.

14. A process according to claim 13 wherein the precipitate is dried at a temperature below 200° C. to a solids content of from 70 to 90 weight percent solids.

References Cited

UNITED STATES PATENTS

| | | | |
|---|---|---|---|
| 3,046,259 | 7/1962 | Hess et al. | 260—80 |
| 3,042,970 | 7/1962 | Terenzi | 18—47.3 |
| 3,215,680 | 11/1965 | Kolodny | 260—89.7 |
| 3,255,142 | 6/1966 | Terenzi | 260—29.6 |

FOREIGN PATENTS

| | | |
|---|---|---|
| 766,565 | 1/1957 | England. |
| 841,279 | 7/1960 | England. |
| 851,638 | 10/1960 | England. |
| 859,493 | 1/1961 | England. |
| 1,114,161 | 5/1968 | Germany. |

JOSEPH L. SCHOFER, Primary Examiner

S. M. LEVIN, Assistant Examiner

U.S. Cl. X.R.

260—17, 79.3 M, 80.3 N, 80.3 R, 85.5 S, 86.1 N, 89.5 S, 89.7 S, 96 R, 875